Patented Sept. 7, 1926.

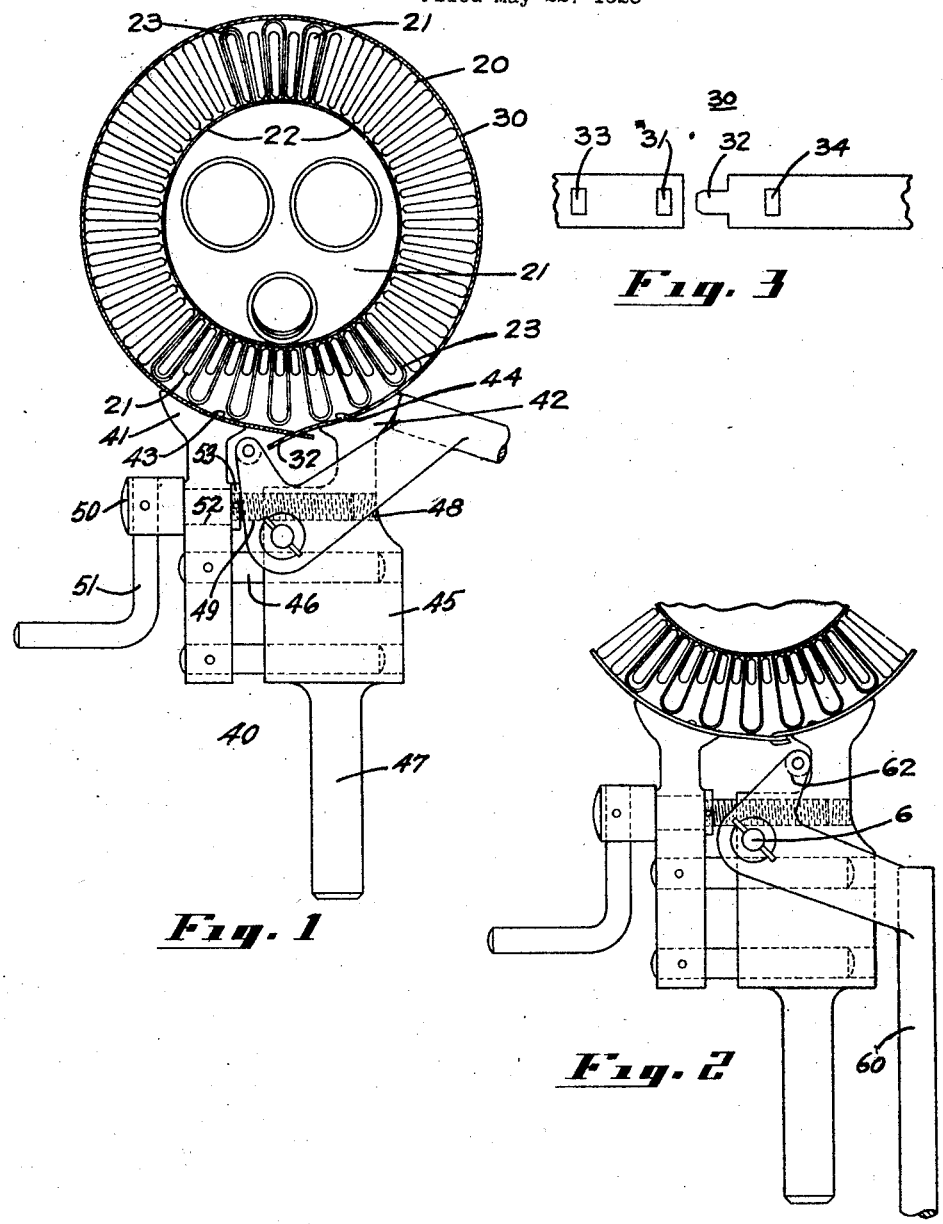

1,598,799

UNITED STATES PATENT OFFICE.

ROBERT BLAIR AND WILLIAM R. FISCHER, OF DAYTON, OHIO, ASSIGNORS TO GENERAL MOTORS RESEARCH CORPORATION, OF DAYTON, OHIO, A CORPORATION OF DELAWARE.

BANDING APPARATUS.

Application filed May 22, 1923. Serial No. 640,770.

This invention relates to holding objects together by means of encircling bands or the like and has among its objects to secure or clamp parts together by devices, such as strips of sheet material, more effectively and rapidly than heretofore.

Other and further objects of the present invention will be apparent from the following description, reference being had to the accompanying drawings, wherein a preferred form of embodiment of the present invention is clearly shown.

In the drawings:

Fig. 1 is a plan view showing the use of a clamping band embodying the present invention and apparatus for drawing the ends of the band together and prior to securing the ends permanently in position, the band being shown in section;

Fig. 2 is a fragmentary view similar to Fig. 1 showing the ends of the band secured together; and Fig. 3 is a fragmentary view on an enlarged scale showing the ends of the clamping band.

For the purposes of illustration the use of the band in the manufacture of an air-cooled engine cylinder has been chosen. The manufacture of such a cylinder is disclosed in detail in the copending application of Charles F. Kettering, Serial No. 514,014, filed November 9, 1921. For the purposes of understanding the present invention it is sufficient to state that there is provided a continuous strip of fin material including a plurality of fin loops of equal height 20 and other fin loops of varying height 21 and shorter than the fin loops 20. This fin material is wrapped about an engine cylinder 21, there being a strip of brazing material 22 interposed between the bases of the fins and the outside of the cylinder. In order that the cylinder, fin material and brazing material may be clamped together for heat treatment by means of a clamping band, a plurality of U-shaped spacers 23 are located around each one of the relatively shorter fin loops 21 in order that a circle concentric to the cylinder will be substantially tangent with the fin loops 20 and the spacers 23, for the purposes to be described.

The parts mentioned are clamped together by means of one or more clamping bands 30 having interlocking end provisions comprising an orifice 31 adjacent one end for receiving a tongue 32 provided at the other end of the band.

For receiving a suitable tool used for drawing the ends of the bands together, each band is provided adjacent its end with apertures 33 and 34.

A band 30 is placed around the fin material and spacers as shown in Fig. 1, and the ends of the band are interlocked, that is, the tongue 32 is inserted through the hole 31. Before the tongue 32 is bent over the other end of the band as shown in Fig. 2, the ends of the bands are drawn very tightly about the fin material and spacers in order that the fin material and brazing material may be firmly clamped about the exterior of the cylinder. This is accomplished by means of a tool 40 provided with relatively movable jaws 41 and 42 each provided with a cylindrical surface, adapted to conform with the cylindrical surface of the band 30 when secured in place, and provided with lugs 43 and 44 adapted to be received by the apertures 33 and 34. The jaw 42 includes a body portion 45 which is apertured to support guide rods 46 to which the jaw 41 is attached. The portion 45 is provided with a handle 47. Portion 45 is threaded at 48 to receive the screw threaded end 49 of a shaft 50 to which is pinned a crank 51. The reduced portion 52 of the shaft 50 passes through a plain hole in jaw 41 and then is reduced to the diameter of the threaded portion 49. A collar 53 is secured to the threaded portion 49 in order to prevent endwise movement of the shaft 50 relative to the jaw 41.

By turning the crank 51, the jaws 41 and 42 may be caused to approach one another to cause the ends of the clamping band to be drawn together to press the fin material and brazing material firmly against the engine cylinders. While the band 30 is thus maintained in clamping position its interlocking end portions are operated upon so as to hold the band permanently in position. This operation is performed by means of a lever 60 pivoted at 61 upon the body portion 45 of jaw 42 and carrying a roller 62 adapted to engage the tongue 32 and to bend it from the position shown in Fig. 1 to that shown in Fig. 2, in order to maintain the clamping band in position.

After one or more bands have been applied to the fin material the cylinder is subjected to heat treatment while the bands hold the fin material temporarily in place. This heat treating operation permanently unites the fins and cylinders and then the bands may be removed and discarded if desired. These bands can be made in large quantities very cheaply of sheet material, and the operation of banding the assembly can be accomplished effectively and rapidly.

While the invention has been shown in connection with the manufacture of the cylinder, it is apparent that it is susceptible of other uses, such as bailing and cooperage.

While the form of mechanism herein shown and described constitutes a preferred form of embodiment of the invention, it is to be understood that other forms might be adopted, all coming within the scope of the claims which follow.

What we claim is as follows:

1. A device for securing a binder around an assembly, said binder having an orifice at one end and a tongue at its other end, adapted to be inserted in the orifice, comprising in combination, a vise-like clamp having spaced jaws adapted to grip the binder adjacent its ends; means for drawing the jaws together whereby the tongue may be inserted in the orifice of the binder; and means pivotally secured to one of the jaws of the clamp and operable to bend the tongue over the aperture for interlocking the ends of the binder.

2. A device for securing a binder, consisting of a flexible band of metal or the like, around an assembly, comprising means for engaging the band upon opposite sides of the point at which the band ends are to be secured together; means for causing said engaging means to approach each other and tighten the band around the assembly while having the ends free to be united; and means mounted on the device and arranged to be moved in such a manner as to bend upon itself an end of the band which has been interlaced with its other end.

3. A device for securing a binder, consisting of a flexible band of metal or the like, around an assembly, comprising means for engaging the band which includes relatively movable band-seizing jaws; means for moving the jaws toward each other in substantially parallel relation; and a movable bending device having an operative end disposed between the jaws in position to bend upon itself an end of the band that has been interlaced with its other end.

4. A device for securing a binder around an assembly said binder comprising a band of metal having a tongued end adapted to be inserted in an orifice provided at its opposite end, comprising in combination a vise-like clamp including jaws adapted to seize the binder adjacent its ends; means for moving the jaws toward each other and for locking them in any position whereby the ends of the binder are held in juxtaposition to permit insertion of the tongued end into the orifice; and a crimping lever secured to the clamp for bending the tongue over the edge of the orifice to lock the binder in assembly-gripping position.

In testimony whereof we hereto affix our signatures.

ROBERT BLAIR.
WILLIAM R. FISCHER.